(12) United States Patent
Li et al.

(10) Patent No.: US 9,708,202 B2
(45) Date of Patent: Jul. 18, 2017

(54) ELECTROPLATING WASTE WATER TREATMENT METHOD

(71) Applicants: Nanjing University, Nanjing, Jiangsu (CN); Nanjing University Yancheng Environmental Protection Technology and Engineering Research Institute, Yancheng, Jiangsu (CN)

(72) Inventors: Aimin Li, Jiangsu (CN); Lichun Fu, Jiangsu (CN); Fuqiang Liu, Jiangsu (CN); Qing Zhou, Jiangsu (CN); Jianjun Dai, Jiangsu (CN); Zhaoyang Lu, Jiangsu (CN); Yan Li, Jiangsu (CN); Chendong Shuang, Jiangsu (CN); Jinnan Wang, Jiangsu (CN); Weiwei Zhao, Jiangsu (CN)

(73) Assignees: NANJING UNIVERSITY, Nanjing, Jiangsu (CN); NANJING UNIVERSITY YANCHENG ENVIRONMENTAL PROTECTION TECHNOLOGY AND ENGINEERING RESEARCH INSTITUTE, Yancheng, Jiangsu (CN)

( * ) Notice: Subject to any disclaimer, the term of this patent is extended or adjusted under 35 U.S.C. 154(b) by 357 days.

(21) Appl. No.: 14/412,218

(22) PCT Filed: Mar. 27, 2013

(86) PCT No.: PCT/CN2013/073277
§ 371 (c)(1),
(2) Date: Dec. 31, 2014

(87) PCT Pub. No.: WO2013/159624
PCT Pub. Date: Oct. 31, 2013

(65) Prior Publication Data
US 2015/0291449 A1  Oct. 15, 2015

(30) Foreign Application Priority Data

Apr. 28, 2012 (CN) .................. 2012 1 0130587

(51) Int. Cl.
*C02F 9/00* (2006.01)
*C02F 1/461* (2006.01)
(Continued)

(52) U.S. Cl.
CPC .............. *C02F 1/461* (2013.01); *C02F 9/00* (2013.01); *C02F 1/285* (2013.01); *C02F 1/42* (2013.01);
(Continued)

(58) Field of Classification Search
None
See application file for complete search history.

(56) References Cited

U.S. PATENT DOCUMENTS

| 4,818,404 A * | 4/1989 | McDowell ................ C02F 3/06 |
| | | 210/603 |
| 2010/0133196 A1* | 6/2010 | Khudenko ............. B01D 24/06 |
| | | 210/668 |
| 2012/0006744 A1* | 1/2012 | Phattaranawik ........ C02F 3/301 |
| | | 210/605 |

FOREIGN PATENT DOCUMENTS

| CN | 1131112 C | 12/2003 |
| CN | 100560617 C | 11/2009 |

(Continued)

OTHER PUBLICATIONS

Meifen Cheng et al. "Study on the Treatment of Electroplating Wastewater by Air Floatation-Biochemical Treatment-Coagulative Precipitation Process" Industrial Wastewater Treatment, vol. 30, No. 2, Feb. 2010.

(Continued)

*Primary Examiner* — Chester Barry
(74) *Attorney, Agent, or Firm* — Novick, Kim & Lee, PLLC; Allen Xue

(57) ABSTRACT

An efficient combined advanced treatment method of electroplating wastewater is disclosed, which belongs to the
(Continued)

technical field of electroplating wastewater treatment. The method includes: after pretreatments including cyanide breaking, dechromization and coagulating sedimentation, introducing the electroplating wastewater to a contact oxidation tank for biochemical treatment, and settling the effluent from the contact oxidation tank down in an inclined pipe of a secondary sedimentation tank to realize the separation of the sludge from water; charging the effluent to a coagulating sedimentation tank, and undergoing coagulating sedimentation with the aid of a flocculant and a coagulant aid added; feeding the effluent, as an influent, to a resin adsorption tank for adsorption with a magnetic resin; and after passing through a filter, flowing the effluent after adsorption to a fixed bed resin adsorption unit, so as to realize the discharge up to standard and recycle of the effluent.

5 Claims, 1 Drawing Sheet

(51) Int. Cl.
| | | |
|---|---|---|
| C02F 1/28 | (2006.01) | |
| C02F 1/42 | (2006.01) | |
| C02F 1/52 | (2006.01) | |
| C02F 3/06 | (2006.01) | |
| C02F 101/20 | (2006.01) | |
| C02F 101/22 | (2006.01) | |
| C02F 103/16 | (2006.01) | |

(52) U.S. Cl.
CPC .............. *C02F 1/5245* (2013.01); *C02F 3/06* (2013.01); *C02F 2101/20* (2013.01); *C02F 2101/22* (2013.01); *C02F 2103/16* (2013.01); *C02F 2201/46105* (2013.01); *Y02W 10/15* (2015.05)

(56) References Cited

FOREIGN PATENT DOCUMENTS

| CN | 1935861 B | 4/2010 |
|---|---|---|
| CN | 101708475 A | 5/2010 |
| CN | 101773812 A | 7/2010 |
| CN | 101905931 A | 12/2010 |
| CN | 101935119 A | 1/2011 |
| CN | 102115295 A | 7/2011 |
| CN | 102295723 A | 12/2011 |
| CN | 102642991 A | 8/2012 |

OTHER PUBLICATIONS

Haibing Cong et al. "Pulse Water-Lifting Aeration Bio-Contact Oxidation Process for Purification of Micro-Polluted Water" China Water & Wastewater, vol. 27, No. 19, Oct. 2011.
Gang Wang et al. "Treatment of Electroplating Plant Wastewater by Fenton Reagent and Biological Contact Oxidation process" Guangdong Chemical Industry, vol. 38, No. 7, 2011.
Ting Yao et al. "Microelectrolysis/Plate Setter/Biological Contact Oxidation Process for Treatment of Printed Circuit Board Wastewater" Recyclable Resources and Circular Economy, vol. 4, No. 9, 2011.
Zukun Bu et al. "Application of Miex Resin in Acrylic Wastewater Treatment" Industrial Safety and Environmental Protection, vol. 36, No. 1, Jan. 2010.
Fan Luo et al. "Adsorption of Metal Cation by Chelating Resin" Technology of Water Treatment, vol. 37, No. 1, 2011.
Shuai Wang et al. "Progress of Adsorption of Precious Metal Ions of Chelating Resins" Applied Chemical Industry, vol. 39, No. 5, May 2010.
Mingsheng Zhang et al. "Study on the Experiment of High Salinity Wastewater Treatment with Bio-Contact Oxidation System" Applied Chemical Industry, vol. 37, No. 11, 2008.
Jing Zhao et al. "Study on Treatment of Copper and Nickel Electroplating Wastewater by Fenton Oxidation-Biological Aerated Filter Process" Electroplating & Finishing, vol. 29, No. 4, 2010.

* cited by examiner

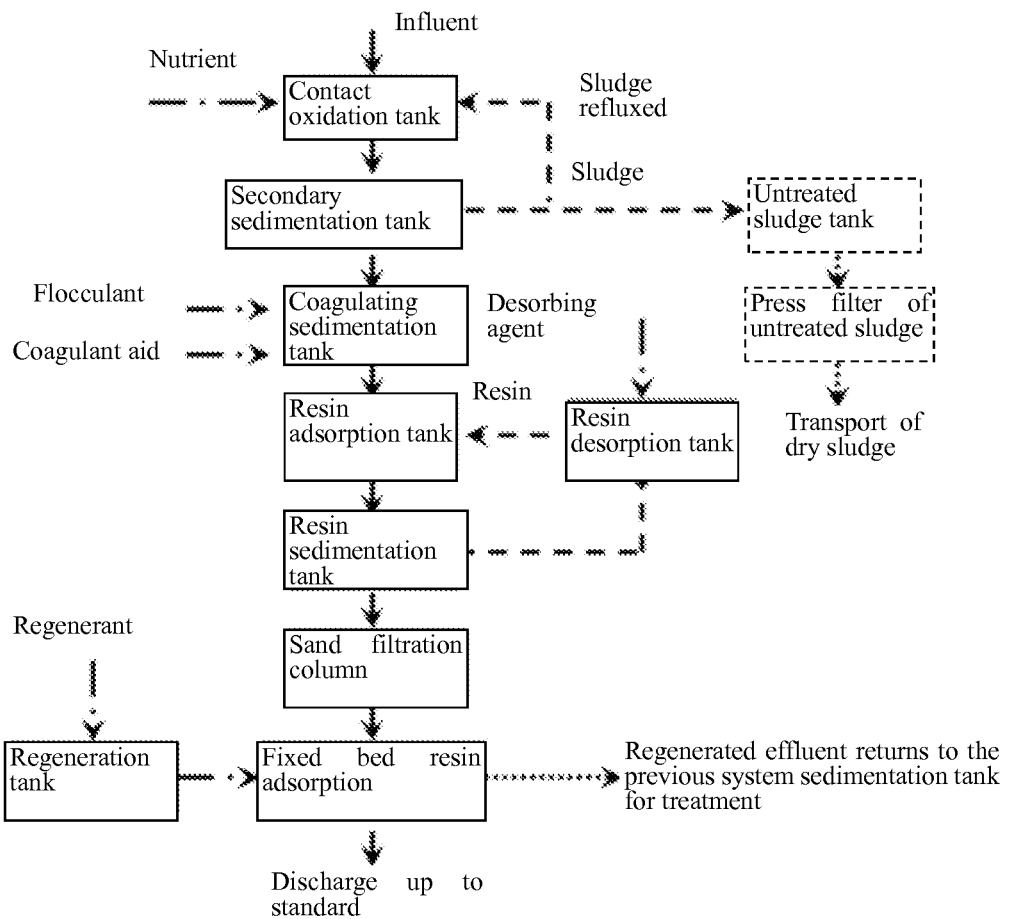

ELECTROPLATING WASTE WATER TREATMENT METHOD

TECHNICAL FIELD

The present invention relates to the technical field of electroplating wastewater treatment, and more specifically, to an efficient combined advanced treatment method of electroplating wastewater, which is a method for advanced treatment of heavy metals and organic substances by systematically combining the bio-contact oxidation, the coagulating sedimentation, and the magnetic resin and fixed bed resin adsorption processes, and with which recycle or discharge up to standard of the final effluent are realized.

BACKGROUND ART

Electroplating industry causes heavy pollution, and the composition of the wastewater therefrom is complex due to the numerous electroplating types and the troublesome process. The pollution caused by electroplating wastewater is mainly characterized by coexistence of heavy metals and organic pollutants. A variety of carcinogenic, teratogenic and mutagenic or highly toxic substances are present in the electroplating wastewater. In recent decades, the pollution control techniques against heavy metals and organic substances in the electroplating wastewater, such as chemical precipitation, adsorption, biological method, electrolysis, membrane separation and ferrite, have been widely researched and applied. However, with the implementation of the new *Discharge Standard for Pollutants from Electroplating* (GB21900-2008), the discharge standard cannot be met if the electroplating wastewater is treated following the existing conventional treatment methods. In view of the state of the art, a single technology is hard to meet the high discharge standard, so it is necessary to develop an economical and efficient combined process.

Bio-contact oxidation technology is a biofilm process functioning between the activated sludge process and the biological filter process, and characterized by arranging a packing in the tank, oxygenating the sewage through aeration at the bottom of the tank, and allowing the sewage in the tank to be in a flowing state, to ensure the full contact between the sewage and the packing in the sewage, and avoid the defects of insufficient contact between the sewage and the packing in the bio-contact oxidation tank. The bio-contact oxidation process has found wide use in printing and dyeing, oily, electronic and electroplating wastewater with high salinity and non-biodegradable organic substances, as described in published literatures, for example, Study on the Experiment of High Salinity Wastewater Treatment with Bio-Contact Oxidation System, *Applied Chemical Industry*, Vol. 37, No. 11, 2008; Pulse Water-Lifting Aeration Bio-Contact Oxidation Process for Purification of Micro-Polluted Water, *China Water & Wastewater*, Vol. 27, No. 19, 2011; Treatment of Electroplating Plant Wastewater by Fenton Reagent and Biological Contact Oxidation process, *Guangdong Chemical Industry*, Vol. 38, No. 7, 2011; and Microelectrolysis/Plate Setter/Biological Contact Oxidation Process for Treatment of Printed Circuit Board Wastewater, *Recyclable Resources and Circular Economy*, Vol. 4, No. 9, 2011.

Adsorption is an important advanced treatment technology for chemical tail water. However, the activated carbon is difficult to be regenerated, and is costly in industrialization. As a synthetic adsorbing material, resin has the advantage of being renewable, as compared with the activated carbon. Electroplating wastewater is characterized by high salinity and poor biodegradability. Therefore, after the bio-contact oxidation process with the carbon nutrient source added to the electroplating wastewater post pretreatment, advanced treatment is required to further improve the water quality of the effluent.

Magnetic resin is a magnetic macromolecule polymer, and can be quickly separated from water by means of the magnetism. Besides, the magnetic resin has a small diameter of generally less than 0.2 mm, such that the pollutants are easier to diffuse into the internal porous channel of the magnetic resin. In this regard, a series of research and development efforts are made by the ORICA Company, Australian and Nanjing University. The effects of the application of magnetic resins in water treatment are described in published literatures, for example, Application of MIEX Resin in Acrylic Wastewater Treatment, *Industrial Safety and Environmental Protection*, No. 01, 2010.

A chelating resin can selectively adsorb heavy metal ions in wastewater. Literatures show that the chelating resin has a higher selectivity than a common cation exchange resin, as described in, for example, Adsorption of Metal Cation by Chelating Resin, *Technology of Water Treatment*, Vol. 37, No. 1, 2011; Progress of Adsorption of Precious Metal Ions of Chelating Resins, *Applied Chemical Industry*, Vol. 39, No. 5, 2010.

As described in Cheng Meifen et al. Study on the Treatment of Electroplating Wastewater by Air Floatation-Biochemical Treatment-Coagulative Precipitation Process, *Industrial Wastewater Treatment*, Vol. 30, No. 2, 2010, the CODcr in the effluent after treatment is 80 mg/L or below. As described in Zhao Jing et al. Study on Treatment of Copper and Nickel Electroplating Wastewater by Fenton Oxidation-Biological Aerated Filter Process, *Electroplating & Finishing*, Vol. 29, No. 4, 2010, the CODcr in the effluent after treatment is 80 mg/L or below, the concentration of $Cu^{2+}$ is 0.5 mg/L or below and the concentration of $Ni^{2+}$ is 0.5 mg/L or below. As described in Wang Gang et al. Treatment of Electroplating Plant Wastewater by Fenton Reagent and Biological Contact Oxidation Process, *Guangdong Chemical Industry*, Vol. 38, No. 7, 2011, the quality indexes of the effluent are as follows: CODcr≤80 mg/L, $Cu^{2+}$≤0.5 mg/L, $Ni^{2+}$≤0.5 mg/L, $Cr^{6+}$≤0.4 mg/L and cyanide≤0.4 mg/L. As described in Yao Ting, Microelectrolysis/Plate Setter/Biological Contact Oxidation Process for Treatment of Printed Circuit Board Wastewater, *Recyclable Resources and Circular Economy*, Vol. 4, No. 9, 2011, the COD and the concentrations of $Cu^{2+}$ and $Ni^{2+}$ in the effluent can only meet the Class I discharge standard in the *Integrated Wastewater Discharge Standard* (GB8978-1996). Accordingly, the existing literatures show that although the combination of the bio-contact oxidation and various processes in the prior art can achieve high removal rate of the pollutants in the electroplating wastewater, the water quality of the effluent can only meet the Class I discharge standard in the *Integrated Wastewater Discharge Standard* (GB8978-1996) or approximate the new *Discharge Standard for Pollutants from Electroplating* (GB21900-2008), that is, the major pollution indexes: CODcr≤80 to 100 mg/L, $Cu^{2+}$≤0.5 mg/L, and $Ni^{2+}$≤0.5 mg/L.

With the increasingly rigorous environmental protection standards, especially in regions with high territorial development density, decreased environmental carrying capacity, or low water environmental capacity and fragile ecological environment, the local wastewater discharge standards are even stricter. It is still a difficulty in research to develop an economical and efficient combined advanced treatment technique for electroplating wastewater.

SUMMARY OF THE INVENTION

Technical Problems to be Solved in the Invention

In order to realize discharge up to standard of the effluent of electroplating wastewater after pretreatments with conventional methods such as cyanide breaking, dechromisation and coagulating sedimentation, the present invention provides an efficient combined advanced treatment method of electroplating wastewater. The water quality after treatment by the method of the present invention can meet the standard in Table 3 of *Discharge Standard for Pollutants from Electroplating* (GB21900-2008) and the Class III Water Standard of *Environmental Quality Standards for Surface Water* (GB3838-2002). The final effluent can be recycled or safely discharged. The process has the advantages of high compatibility with wastewater, good economic performance and low treatment costs.

Technical Solution

To achieve the above objective, the present invention employs the technical solution below:

An efficient combined advanced treatment method of electroplating wastewater according to the present invention includes:

(1) bio-contact oxidation: after subjecting the electroplating wastewater to pretreatments including cyanide breaking, dechromisation and coagulating sedimentation, introducing the effluent, as an influent, to a contact oxidation tank for biochemical treatment, and settling the effluent from the contact oxidation tank down in an inclined pipe of a secondary sedimentation tank to realize the separation of sludge from water, where after pretreatments, the quality indexes of the effluent are: the concentrations of the heavy metals $Cu^{2+}$ and $Ni^{2+}$: below 2.0 mg/L, the concentration of cyanide: below 2.0 mg/L, and COD: 80 to 200 mg/L;

(2) coagulating sedimentation: charging the effluent from the step (1) to a coagulating sedimentation tank, and undergoing coagulating sedimentation with the aid of a flocculant and a coagulant aid added, to further remove the suspended solids, and the heavy metals $Cu^{2+}$ and $Ni^{2+}$ in the effluent after biochemical treatment;

(3) magnetic resin adsorption: feeding the effluent from the step (2), as an influent, to a resin adsorption tank for adsorption with a magnetic resin; and (4) fixed bed resin adsorption: after passing through a filter, flowing the effluent from the step (3) to a fixed bed resin adsorption unit, to realize discharge up to standard or recycle of the effluent.

Furthermore, in the bio-contact oxidation of the step (1), the contact oxidation tank is at a pH of 6.5 to 8 and at a temperature of 15 to 30° C. Biodegradable nutrients are manually added to adjust the BOD/COD to 0.3 or above, and the dissolved oxygen (DO) content is controlled at 2 to 5 mg/L by means of intermittent aeration. The sludge generated in the contact oxidation tank is filter-pressed by a plate and frame filter press, and the dry sludge is transported for treatment.

Furthermore, in the coagulating sedimentation of the step (2), the flocculant may be one or a mixture of more than one of a polyferric flocculant, a polyaluminum flocculant and a polyaluminum-ferric flocculant, and the coagulant aid is polyacrylamide, where the flocculant is added in an amount of 1 to 5‰ by volume of the wastewater to be treated, and the coagulant aid is added in an amount of 0.1‰ by volume of the wastewater to be treated.

Furthermore, in the step (3), the magnetic resin is added in an amount of 1 to 20‰ by volume of the wastewater to be treated, and the magnetic resin is separated from water by gravity settling with mechanical stirring. The magnetic resin refers to a magnetic macromolecule polymer having a particle diameter of less than 0.2 mm, including but not limited to the products developed by Nanjing University and ORICA Company, Australian. The magnetic resin is preferably the magnetic polystyrene-based microspherical strongly basic anion exchange resin disclosed in Patent Application No. 200910264445.X filed by Nanjing University on Dec. 22, 2009. The magnetic polystyrene-based strongly basic anion exchange resin is the magnetic polystyrene-based strongly basic anion exchange microsphere resin disclosed in Patent Application No. 20101001768.1 filed by Nanjing University on Jan. 12, 2010, and the operation mode of the magnetic resin adsorption is preferably an advanced treatment method of biochemical tail water based on a magnetic resin disclosed in Patent Application No. 201010110042.2 filed by Nanjing University on Feb. 11, 2010.

Furthermore, the filter in the step (4) is a sand filter, activated carbon, a precision filter or a fiber ball filter device. In the fixed bed resin adsorption, the resin is one or a mixture of more than one of a cation exchange resin, an anion exchange resin, a chelating resin and an ultra-high cross-linked resin. The chelating resin is preferably the N,N-bis (carboxymethyl) disubstituted dithiocarbamate chelating resin developed by Nanjing University as disclosed in Chinese Patent No. CN100560617C granted on Nov. 18, 2009, N-methyl, N-carboxymethyl dithiocarbamate chelating resin developed by Nanjing University as disclosed in Chinese Patent No. CN1935861B granted on Apr. 21, 2010, and 6-aminopyridine-3-carboxylic acid chelating resin disclosed in Patent Application No. 201110133903.3 filed by Nanjing University on May 24, 2011. The ultra-high cross-linked resin is preferably the ultra-high cross-linked weakly basic anion exchange resin with dual functions developed by Nanjing University, as disclosed in Chinese Patent No. CN1131112C granted on Dec. 17, 2003.

PRINCIPLE OF THE INVENTION

According to the present invention, the electroplating wastewater with high salinity and poor biodegradability is treated by using a bio-contact oxidation process. Some biodegradable organic pollutants are removed through biochemical treatment by manually adding nutrients. Some SS, COD and trace heavy metals are removed from the biochemical tail water through coagulating sedimentation. Effluent after coagulating sedimentation is fed to a magnetic resin adsorption tank to remove the COD and colority that are difficult to remove by conventional methods. Finally, the fixed bed resin adsorption column is used to further guarantee that the concentration of heavy metal ions in the final effluent can meet the Class III Water Standard of *Environmental Quality Standards for Surface Water*, especially that the concentrations of $Cu^{2+}$ and $Ni^{2+}$ are below 0.02 mg/L. The coagulating sedimentation, as the pretreatment before magnetic resin adsorption and fixed bed resin adsorption, can improve the adsorption efficiency and prolong the service life of the resins.

Beneficial Effects

Compared with the prior art, the technical solution provided by the present invention has the following significant effects:

(1) In the efficient combined advanced treatment method of electroplating wastewater according to the present invention, a combined process of "bio-contact oxidation—coagulating sedimentation—magnetic resin adsorption—fixed bed resin adsorption" is used. After the conventional biochemical treatment and coagulation, a magnetic resin is added to remove some organic substances through fully mixed adsorption, so as to ensure that the chemical oxygen demand CODcr is 20 mg/L or below. Finally, a fixed bed is introduced, which has two columns connected in series, and has a chelating resin therein for adsorption. By means of the selective adsorption of the chelating resin for heavy metals, it is ensured that the concentration of $Cu^{2+}$ is 0.02 mg/L or below and the concentration of $Ni^{2+}$ is 0.02 mg/L or below.

(2) By the present invention, not only the defect of the conventional single bio-contact oxidation process that CODcr in the effluent after secondary sedimentation is high is overcome, but also the problem that the heavy metal removal with the traditional coagulating sedimentation process fails to reach advanced treatment requirements is solved. The present invention can ensure that the water quality of the effluent reaches the *Discharge Standard for Pollutants from Electroplating* (GB21900-2008) and the Class III water standard of *Environmental Quality Standards for Surface Water* (GB3838-2002). The process has the advantages of high compatibility with wastewater, good economic performance and low treatment cost.

with an aerator, and the hydraulic retention time was 10 h. The sludge generated in the contact oxidation tank was filter-pressed by a plate and frame filter press, and then the dry sludge was transported for treatment.

(2) Coagulating sedimentation: The effluent from the step (1) was charged to a coagulating sedimentation tank. A polyferric flocculant polyferric sulfate (PFS) was used in an amount 1‰ by volume of the wastewater to be treated. Polyacrylamide (PAM) was used as the coagulant aid in an amount of 0.1‰ by volume of the wastewater to be treated.

(3) Magnetic resin adsorption: The effluent from the step (2) was feed, as an influent, to a resin adsorption tank for adsorption with a magnetic resin. The magnetic resin was the magnetic polystyrene-based microspherical strongly basic anion exchange resin disclosed in Patent Application No. 200910264445.X filed by Nanjing University on Dec. 22, 2009, and was used in an amount of 5‰ by volume of the wastewater to be treated. The magnetic resin was separated from water by gravity settling with mechanical stirring. A conventional desorption process was used for the resin desorption.

(4) Fixed bed resin adsorption: After passing through a precision filter, the effluent from the step (3) was flowed to a fixed bed resin adsorption unit for adsorption in two columns connected in series. The resin used was the N-methyl, N-carboxymethyl dithiocarbamate chelating resin developed by Nanjing University as disclosed in Chinese Patent No. CN1935861B granted on Apr. 21, 2010, and the ultra-high cross-linked weakly basic anion exchange resin with dual functions developed by Nanjing University as disclosed in Chinese Patent No. CN1131112C granted on Dec. 17, 2003. The chelating resin column was in front of the ultra-high cross-linked resin column. The water quality of the effluent post treatment is shown in Table 1.

TABLE 1

Quality indexes of the effluent prior and post treatment in Example 1

Unit: mg/L

| Index | pH | SS | Total Cu | Total Ni | Total Zn | $CN^-$ | $Cr^{6+}$ | Total Cr | COD |
|---|---|---|---|---|---|---|---|---|---|
| Effluent prior treatment | 7.0 | 50 | 0.6 | 2.0 | 1.0 | 1.8 | 0.5 | 0.8 | 80 |
| Effluent post treatment | 6.8 | 20 | 0.02 | 0.02 | 0.01 | 0.1 | 0.05 | 0.05 | 20 |

BRIEF DESCRIPTION OF THE DRAWINGS

FIG. 1 is a process chart of an efficient combined advanced treatment method of electroplating wastewater of the present invention.

DETAILED DESCRIPTION OF THE INVENTION

In the following, the present invention is further described in combination with examples.

Example 1

In this example, electroplating wastewater of a workshop after pretreatments including cyanide breaking, dechromisation and coagulating sedimentation, was treated. The water quality of the effluent after pretreatments is shown in Table 1. The treatment steps were as follows.

(1) Bio-contact oxidation: An influent at a pH of 7.0 and at a temperature of 15° C. was introduced to a 100 L bio-contact oxidation tank at a rate of 10 L/h. Glucose was added to adjust the BOD/COD to 0.3. The dissolved oxygen (DO) was maintained at 3.5 mg/L by intermittent aeration Example 2

In this example, electroplating wastewater of an electronic industrial park after pretreatments including cyanide breaking, dechromisation and coagulating sedimentation, was used as the effluent to be treated. Comprehensive wastewater after pretreatments was introduced to a bio-contact oxidation tank at a pH of 8 and at a temperature of 30° C. at a rate of 100 t/d. Glucose was manually added as a nutrient source to control the BOD/COD to 0.4. The dissolved oxygen (DO) content was maintained at 5 mg/L by intermittent aeration, and the hydraulic retention time was 8 h. The effluent from the contact oxidation tank was precipitated in an inclined pipe of a secondary sedimentation tank to realize the separation of sludge from water. The effluent was charged to a coagulating sedimentation tank. A polyaluminum flocculant polyaluminium chloride (PAC) was added in an amount of 1‰ by volume of the wastewater to be treated. Polyacrylamide (PAM) was added as the coagulant aid in an amount of 0.1‰ by volume of the wastewater to be treated for coagulating sedimentation. The effluent after coagulating sedimentation was lifted to a magnetic resin adsorption tank for fully mixed adsorption with a magnetic resin. The amount of the resin was 20‰ of the water. After passing through a sand filter, the effluent after adsorption was flowed to a fixed bed adsorption column for adsorption in two columns connected in series. The resin was the N-methyl, N-carboxymethyl dithiocarbamate chelating resin developed by Nanjing University as disclosed in Chinese Patent No. CN1935861B granted on Apr. 21, 2010. As a result, discharge up to standard or recycle of the wastewater is realized. The quality water of the effluent is shown in Table 2. The monitoring data is provided by the local environmental monitoring station, and some monitoring data of low-concentration heavy metal ions is provided by the Analysis Center of Nanjing University by using an inductively coupled plasma mass spectrometer (ICP-MS).

TABLE 2

Quality indexes of the effluent prior and post treatment in Example 2

| Index | pH | SS | Total Cu | Total Ni | Total Zn | $CN^-$ | $Cr^{6+}$ | Total Cr | Unit: mg/L COD |
|---|---|---|---|---|---|---|---|---|---|
| Effluent prior | 8 | 80 | 1.5 | 1.8 | 0.5 | 1.2 | 0.5 | 1.0 | 180 |
| Effluent post | 7.5 | 30 | 0.01 | 0.02 | 0.01 | 0.1 | 0.05 | 0.05 | 20 |

Example 3

The treatment method in this example was substantially the same as that in Example 1, except that in the step (1), the influent of the contact oxidation tank was at a pH of 6.5 and at a temperature of 25° C., an aerator was used for intermittent aeration, and the dissolved oxygen (DO) content was maintained at 2 mg/L; in the step (2), a polyferric flocculant polyferric sulfate (PFS) and a poly aluminum flocculant polyaluminium chloride (PAC) were added both in an amount of 1‰ by volume of the wastewater to be treated; in the step (3), the amount the magnetic resin was 1‰ by volume of the wastewater to be treated; and in the step (4), the resin was the N,N-bis-(carboxymethyl) disubstituted dithiocarbamate chelating resin developed by Nanjing University as disclosed in Chinese Patent No. CN100560617C granted on Nov. 18, 2009. The water quality of the effluent was substantially the same as that in Table 1.

The process of "bio-contact oxidation—coagulating sedimentation—magnetic resin—fixed bed resin adsorption" of the present invention has the advantages of high compatibility with wastewater, good economic performance and low treatment costs. After advanced treatment with the combined process, the concentrations of heavy metals such as $Cu^{2+}$ and $Ni^{2+}$ were all below 0.02 mg/L, and the COD was maintained at 20 mg/L. The existing literatures show that by the combination of the bio-contact oxidation and various processes in the prior art, the water quality of the effluent can only meet the Class I discharge standard in the *Integrated Wastewater Discharge Standard* (GB8978-1996) or approximate the new *Discharge Standard for Pollutants from Electroplating* (GB21900-2008), that is, the major pollution indexes: CODcr≤80 to 100 mg/L, $Cu^{2+}$≤0.5 mg/L and $Ni^{2+}$≤0.5 mg/L. The advanced treatment process of the present invention can effectively remove heavy metals and organic substances that are difficult to be removed from the electroplating wastewater by conventional physicochemical methods, and the quality of the effluent can meet the standard in Table 3 of *Discharge Standard for Pollutants from Electroplating* (GB21900-2008) and the Class III Water Standard of *Environmental Quality Standards for Surface Water* (GB3838-2002). The final effluent can be recycled or safely discharged.

The invention claimed is:

1. An efficient combined advanced treatment method of electroplating wastewater, comprising:
   (1) subjecting the electroplating wastewater to pretreatments including cyanide breaking, dechromisation and coagulating sedimentation;
   introducing the pretreated electroplating wastewater to a contact oxidation tank for biochemical treatment;
   settling an effluent from the contact oxidation tank in a secondary sedimentation tank to form a sludge and a first liquid,
   wherein, in the pretreated electroplating wastewater, concentrations of $Cu^{2+}$ and $Ni^{2+}$ are below 2.0 mg/L, a concentration of cyanide is below 2.0 mg/L, and COD is 80 to 200 mg/L;
   (2) feeding the first liquid from the step (1) to a coagulating sedimentation tank, and adding a flocculant and a coagulant aid into the first liquid to remove suspended solids, $Cu^{2+}$ and $Ni^{2+}$ in the first liquid by settlement and to obtain a second liquid;
   (3) mixing the second liquid from the step (2) with a magnetic resin to form a mixture; separating the magnetic resin from the mixture to obtain a third liquid; and
   (4) filtering the third liquid from the step (3) using a filter and feeding the filtered third liquid to a fixed bed resin adsorption unit, wherein an effluent from the fixed bed resin adsorption unit is discharged or subject to further treatments.

2. The efficient combined advanced treatment method of electroplating wastewater according to claim 1, characterized in that in the step (1), the pretreated electroplating wastewater in the contact oxidation tank is at a pH of 6.5 to 8 and at a temperature of 15 to 30° C., biodegradable nutrients are manually added into the pretreated electroplating wastewater to adjust the BOD/COD to 0.3 or above, and the dissolved oxygen (DO) content is controlled at 2 to 5 mg/L by means of intermittent aeration, and wherein the sludge generated in the contact oxidation tank is filter-pressed by a plate and frame filter press, and then the dry sludge is transported for treatment.

3. The efficient combined advanced treatment method of electroplating wastewater according to claim 2, characterized in that, in the step (2), the flocculant is selected from a group consisting a polyferric flocculant, a polyaluminum flocculant, a polyaluminum-ferric flocculant, and mixtures thereof, and the coagulant aid is polyacrylamide, wherein the flocculant is in an amount of 1 to 5‰ by volume of the first liquid, and the coagulant aid is in an amount of 0.1‰ by volume of the first liquid.

4. The efficient combined advanced treatment method of electroplating wastewater according to claim 3, characterized in that, in the step (3), the magnetic resin is in amount of 1 to 20‰ by volume of the third liquid, and the magnetic resin is separated from the mixture by gravity settling with mechanical stirring.

5. The efficient combined advanced treatment method of electroplating wastewater according to claim 4, characterized in that, the filter in the step (4) is a sand filter, activated carbon or a fiber ball filter device; and in the fixed bed resin adsorption, the resin is selected from a group consisting of a cation exchange resin, an anion exchange resin, a chelating resin, an ultra-high cross-linked resin, and mixtures thereof.

* * * * *